(12) United States Patent
Takahashi et al.

(10) Patent No.: US 8,349,192 B2
(45) Date of Patent: Jan. 8, 2013

(54) METHOD FOR COLLAPSING MICROBUBBLES

(75) Inventors: Masayoshi Takahashi, Ibaraki (JP); Kaneo Chiba, Miyagi (JP)

(73) Assignee: Reo Laboratory Co., Ltd., Miyagi (JP)

( * ) Notice: Subject to any disclaimer, the term of this patent is extended or adjusted under 35 U.S.C. 154(b) by 990 days.

(21) Appl. No.: 10/574,052

(22) PCT Filed: Sep. 28, 2004

(86) PCT No.: PCT/JP2004/014561
§ 371 (c)(1),
(2), (4) Date: Oct. 13, 2006

(87) PCT Pub. No.: WO2005/030649
PCT Pub. Date: Apr. 7, 2005

(65) Prior Publication Data
US 2007/0287917 A1 Dec. 13, 2007

(30) Foreign Application Priority Data
Sep. 30, 2003 (JP) .................................. 2003-340938

(51) Int. Cl.
*C02F 1/78* (2006.01)
(52) U.S. Cl. ..... 210/760; 210/764; 210/765; 210/195.1; 366/340
(58) Field of Classification Search ............... 210/748, 210/749, 760, 761, 765, 766, 167.01, 194, 210/195.1, 198.1, 205; 261/76, 94; 366/336, 366/340, 174.1, 175.2; 138/40, 41
See application file for complete search history.

(56) References Cited

U.S. PATENT DOCUMENTS 6,221,260 B1 * 4/2001 Chahine et al. .......... 210/748.11

FOREIGN PATENT DOCUMENTS

| JP | 10-066850 | 3/1998 |
|---|---|---|
| JP | 11-309452 | 11/1999 |
| JP | 2000-254483 | 9/2000 |
| JP | 2001-300522 | 10/2001 |
| JP | 2001-300525 | 10/2001 |
| JP | 2002-143885 | 5/2002 |
| JP | 2002-300982 | 10/2002 |
| JP | 2002-355684 | 12/2002 |
| JP | 2003-126850 | 5/2003 |
| JP | 2003-200156 | 7/2003 |
| JP | 2003-245662 | 9/2003 |

OTHER PUBLICATIONS

Takahashi et al. "Effect of Shrinking Microbubble on Gas Hydrate Formation" J. Phys. B. vol. 107, No. 10 (Feb. 2003 web pub. date).*

(Continued)

*Primary Examiner* — Lucas Stelling
(74) *Attorney, Agent, or Firm* — Wenderoth, Lind & Ponack, L.L.P.

(57) ABSTRACT

A method for collapsing a microbubble includes applying stimulation to the microbubble during the gradual decrease of the its size. As a result, the microbubble floating in a solution that decreases in size due to the natural dissolution of a gas contained in the microbubble and disappears after a while, has the speed of its size decrease enhanced and causes the microbubble to disappear.

10 Claims, 8 Drawing Sheets

OTHER PUBLICATIONS

Masayoshi Takahashi, "ζ *Potential of Microbubbles in Aqueous Solutions: Electrical Properties of the Gas—Water Interface*", National Institute of Advanced Industrial Science and Technology (AIST), J. Phys. Chem. B, vol. 109, No. 46, Oct. 2005, pp. 21858-21864.

Masayoshi Takahashi et al., "*Free-Radical Generation from Collapsing Microbubbles in the Absence of a Dynamic Stimulus*", National Institute of Advanced Industrial Science and Technology (AIST), J. Phys. Chem. B, vol. 111, No. 6, Jan. 2007, pp. 1343-1347.

Masayoshi Takahashi et al., "*Formation of Hydroxyl Radicals by Collapsing Ozone Microbubbles under Strongly Acidic Conditions*", National Institute of Advanced Industrial Science and Technology (AIST), J. Phys. Chem. B, vol. 111, No. 39, Sep. 2007, pp. 11443-11446.

Hiroshi Moriwaki et al., "*Sonochemical Decomposition of Perfluorooctane Sulfonate and Perfluorooctanoic Acid*", Environmental Science and Technology, vol. 39, No. 9, Mar. 2005, pp. 3388-3392.

\* cited by examiner

METHOD FOR COLLAPSING MICROBUBBLES

TECHNICAL FIELD

The present invention relates to a method of collapsing microbubble (microbubbles) that is useful in all technical fields, particularly in the technical field of water treatment.

BACKGROUND ART

Bubbles having a diameter of 50 μm or less (microbubbles) are known to have properties different from those of normal bubbles, but the properties of the microbubbles have not yet been well understood. For that reason, various microbubble generators under development recently only generate microbubbles of a gas in aqueous solution, and there is almost no invention that makes the most of the potential properties of microbubbles. An example of the traditional technology using microbubbles is the method described in JP-A-2002-143885 of accelerating the biological activity, metabolism, and consequently growth of organisms. However, although the invention has significant advantages in the field of cultivation of fish and shellfish, it does not disclose or suggest anything about collapsing microbubbles.

An example of the technology using the collapsing phenomenon of bubbles is a method of irradiating an ultrasonic wave in aqueous solutions. However, the method is extremely low in efficiency because the bubbles for collapsing are generated by cavitational action of the ultrasonic wave itself, and has a problem of difficulty in commercialization because of its restricted functions. Since cavitation bubbles contain steam and are present only for an extremely limited period of microseconds, the method had problems that it was not possible to use the effect of another kind of gas as the main content and the effect of the electric charge formed at the gas-liquid interface of the bubbles.

SUMMARY OF THE INVENTION

An object of the present invention, which was made in view of the circumstances described above, is to provide a method for collapsing microbubbles, physical and chemical actions obtained by collapsing microbubbles, a method for collapsing the microbubbles by discharge, a method for collapsing the micro bubbles by ultrasonic wave, a method for collapsing the microbubbles by swirling current, a method for collapsing the microbubbles by using positive or negative pressure, and a method for collapsing the microbubbles by using the catalytic reaction of an oxidizer, as well as a method of decomposing microbes, viruses and the like, which was considered to be impossible by traditional technology.

The object of the present invention is accomplished by a method for collapsing microbubbles, characterized in that, in the step of the microbubbles having a diameter of 50 μm or less floated in a solution decreasing gradually by natural dissolution of the gas contained in the microbubbles and disappearing finally, the microbubbles are disappeared by accelerating the speed of the microbubble size decrease by applying a stimulation to the microbubbles.

The object of the present invention is also accomplished more effectively by forming an ultrahigh-pressure ultrahigh-temperature region inside in an adiabatic compression-like change of the microbubbles caused by decrease of the microbubbles size. The electric charge density at the interface of the microbubbles increases rapidly and a great amount of free radical species are released from the gas-liquid interface. Free radical species such as active oxygen species for decomposition of the substances present inside the microbubbles or in the area surrounding the micro bubbles are generated by collapsing the microbubbles. The method gives rise to a compositional change of the chemical substances dissolved or floated in the solution; or the method sterilizes microorganisms such as microbes, viruses, and others present in the solution.

Further, the object of the present invention is also accomplished more effectively by applying the stimulation as electric discharge in a container containing a microbubble-containing solution generated by using a discharger; the stimulation as an ultrasonic wave irradiated into a container containing a microbubble-containing solution by an ultrasonicator; or the ultrasonicator is connected to the container between a microbubble-containing solution outlet port of a microbubble generator connected to container and an intake of the microbubble generator and the stimulation is given by continuous irradiation of ultrasonic wave into the container by the ultrasonicator.

When a circulation pipe is connected to a container containing a microbubble-containing solution, the object of the present invention is also accomplished more effectively by applying the stimulation as compression, expansion and swirling current generated by circulating part of the microbubble-containing solution in the container by the circulation pump and making the solution pass through an orifice or porous plate having a single or multiple holes installed in the circulation pipe; the circulation pump gives a positive pressure of 0.1 MPa or more to the discharge side; the circulation pump gives a negative pressure lower than the environmental pressure to the intake side; or when a circulation pipe is connected to the container containing a microbubble-containing solution, the stimulation is compression, expansion and swirling current generated by feeding the microbubble-containing solution in the container into the circulation pipe and making the solution pass through an orifice or porous plate having a single or multiple holes installed in the circulation pipe.

The object of the present invention is achieved more effectively by applying the stimulation as forcibly internal circulation, in the pipe for feeding the microbubble-containing solution generated by a microbubble generator to a container, of making the microbubble-containing solution discharged from the microbubble generator pass through a punching plate installed in the pipe, taking in part of the microbubble-containing solution from an intake installed between the punching plate and the container and feeding it into a pump, feeding the microbubble-containing solution into the pump, discharging it from an outlet port installed between the microbubble generator and the punching plate, and making it pass through the punching plate once again; or the pump gives a positive pressure of 0.1 MPa or more to the discharge side; the pump gives a negative pressure lower than the environmental pressure in the upstream pipe; the stimulation is a catalytic reaction generated by allowing an oxidant to react in the presence of a catalyst, the catalyst being copper and the oxidizer being ozone or hydrogen peroxide.

EXPLANATION OF REFERENCE NUMBERS

Figure 1:
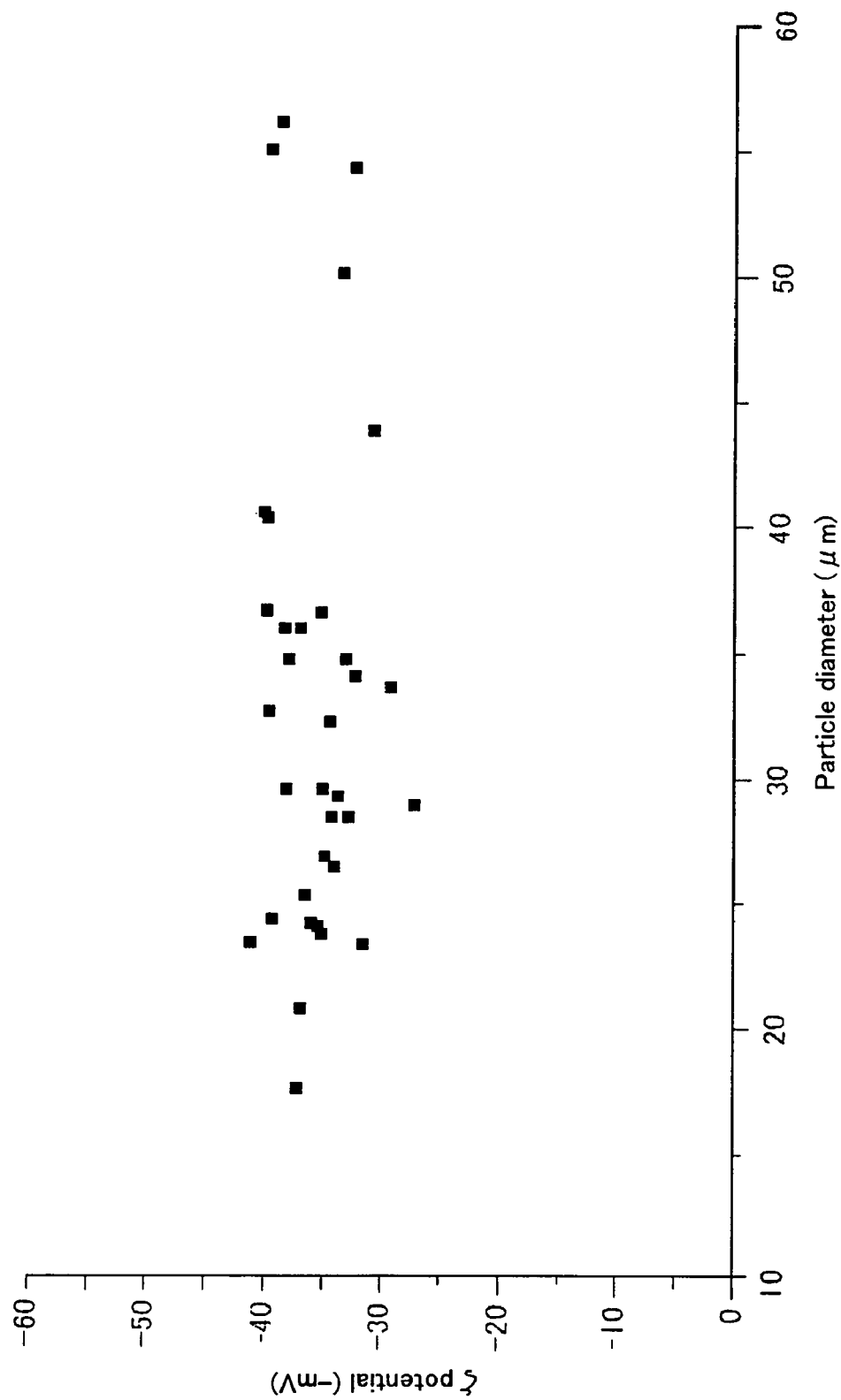
FIG. 1 is a diagram showing the results of measuring the zeta potential of microbubbles in distilled water.

1 Container
2 Discharger
21 Anode
22 Cathode
3 Microbubble generator
31 Intake
32 Microbubble-containing solution outlet
4 Ultrasonicator
5 Circulation pump
6 Orifice (porous plate)
7 Oxidizer-supplying unit
8 Catalyst
9 Pump
10 Punching plate
11 Intake
12 Outlet

DETAILED DESCRIPTION OF THE INVENTION

Figure 2:
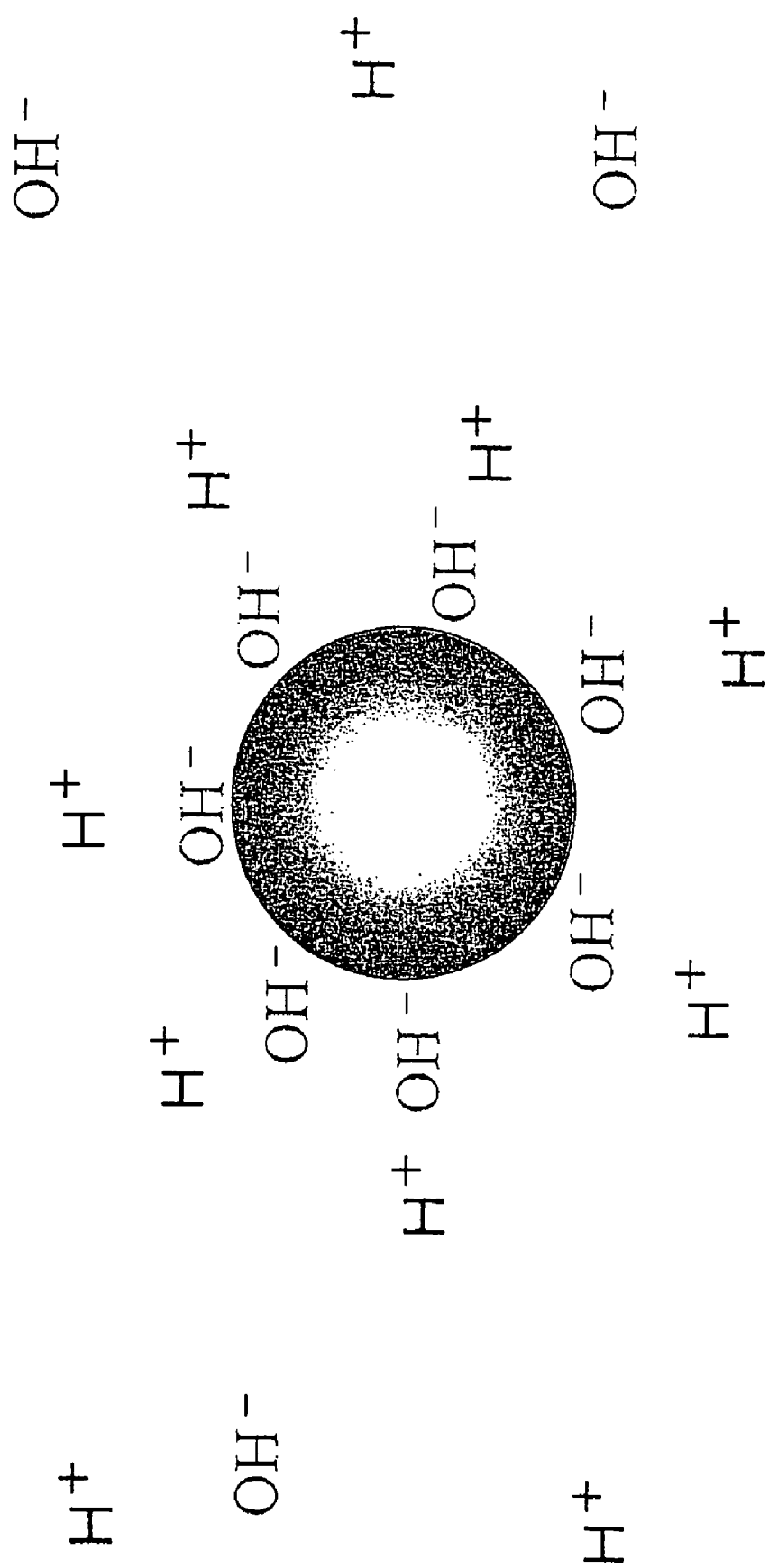
FIG. 2 is a diagram showing the electrification mechanism of microbubbles in water.

As shown in FIG. 1, as a physical property of microbubbles, microbubbles in distilled water have an electric potential of approximately −30 to −50 mV independently of the diameter of bubbles. Thus, as shown in FIG. 2, the microbubble has a structure in which the bubble surface is surrounded by negative ions such as of $OH^-$, which in turn are surrounded additionally by cations such as of $H^+$ ($H3O^+$).

In addition, a microbubble has a greater specific surface and a higher internal pressure than a normal bubble, because the surface tension acts more effectively. It is generally accepted academically that the internal pressure of a microbubble reaches as high as thousands of atmospheric pressures when it disappears.

Figure 3:
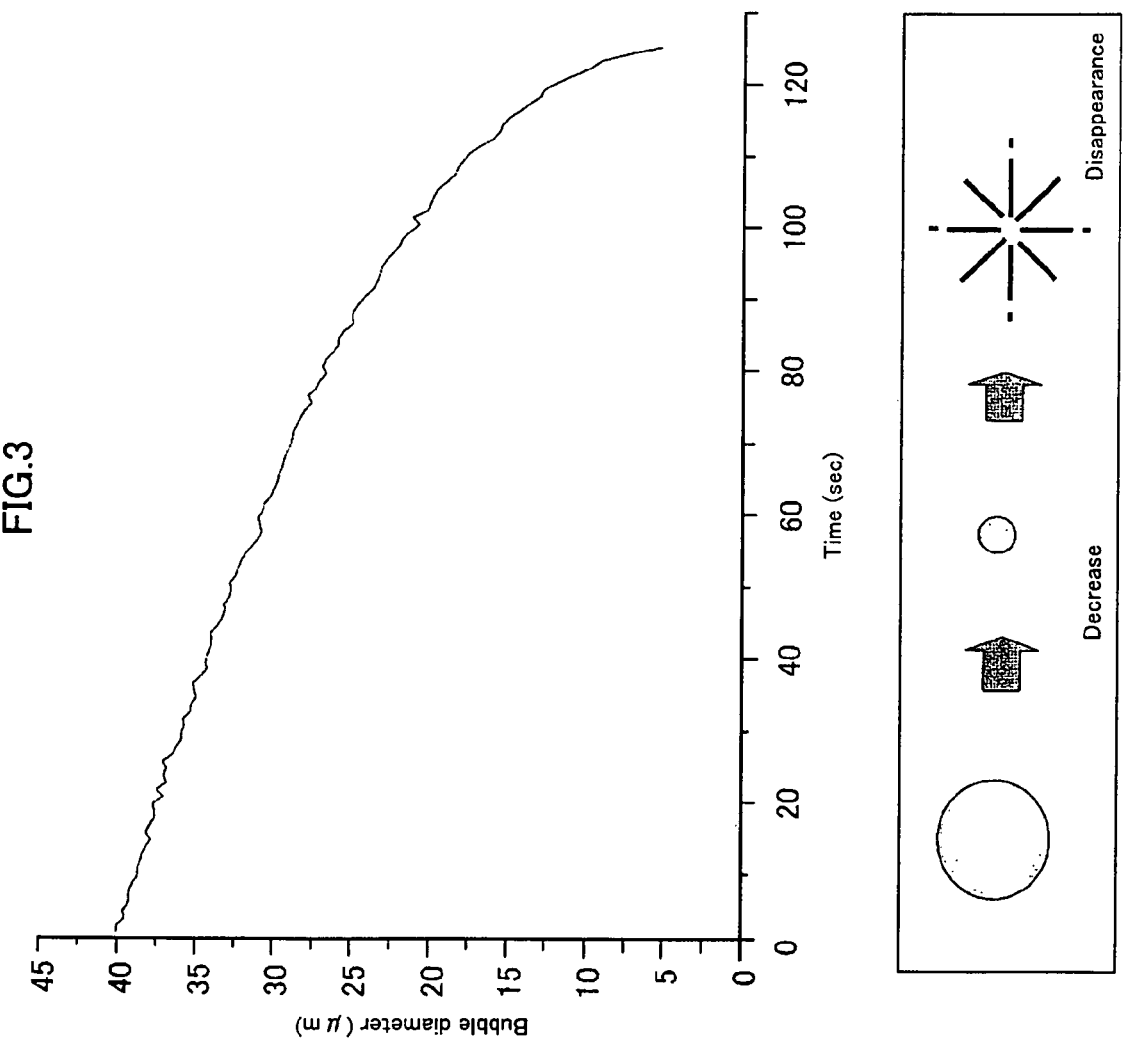
FIG. 3 is a graph showing the relationship between the time period until microbubbles decrease in size and disappear and the bubble diameter of the microbubbles.

A microbubble is a tiny bubble and its rising speed is normally lower than normal bubbles, and it is superior in gas dissolving capacity (natural dissolution). Normal bubbles rise toward the liquid surface direction and burst at the liquid surface, while microbubbles rise more slowly than normal bubbles and have a superior dissolving capacity. Thus, microbubbles gradually decrease in diameter and finally disappear. FIG. 3 shows the change of microbubble diameter with time. The microbubble decreases in size and finally disappears. The microbubble shows a shorter time to disappearance. The most effective driving force of gas dissolution of microbubbles is the self-compression due to the surface tension. The pressure buildup inside the microbubble with respect to environmental pressure can be estimated by the Young-Laplace's Equation.

$$\Delta P = 4\sigma/D \quad \text{(Formula 1)}$$

In the equation, $\Delta P$ represents the degree of pressure buildup; $\sigma$, surface tension; and D, bubble diameter. In distilled water at room temperature, the pressure buildup is approximately 0.3 atmospheric pressure in microbubbles having a diameter of 10 μm and approximately 3 atmospheric pressures in bubbles having a diameter of 1 μm. The compressed gas in microbubbles dissolves efficiently in ambient water accordingly to Henry's law.

On the other hand, the decreasing speed of microbubble size rises by the applications of physical stimulations such as discharge, ultrasonic wave, or swirling current to the microbubble. As a result of this application, adiabatic compression of the microbubble is carried out. Adiabatic compression of the microbubble then gives an extreme reaction field at ultrahigh temperature and ultrahigh pressure when the microbubble disappears (collapsing).

As described above, the microbubbles in distilled water are negatively charged. But the observation of the zeta potential of microbubbles indicates that the saturated electric charges formed at the gas-liquid interface is according to the environmental conditions such as pH of water. The electric charges are not due to electrolytic ions and others in water, but are based on the structural factor of water itself. That is, the electric charge is generated by interfacial adsorption of $OH^-$ and $H^+$ ions due to the difference of the hydrogen-bonded network structure at between the gas-liquid interface and the bulk of the water. The structures also suppress thermal molecular movement at the gas-liquid interface, and it takes time of about several seconds to go back to the equilibrium condition when the electric charge density has fluctuated.

Figure 4:
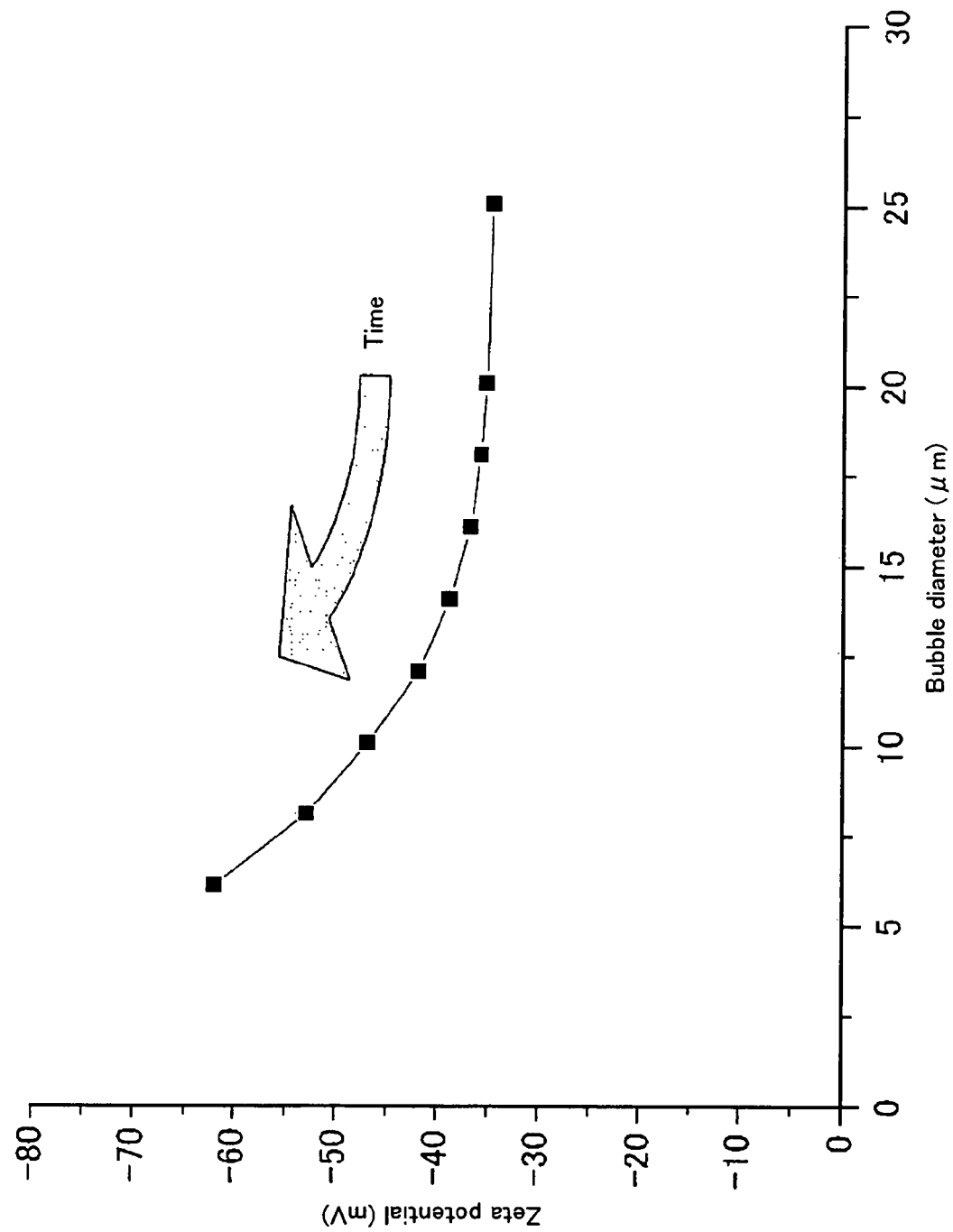
FIG. 4 is a graph showing the increase in zeta potential associated with decrease of microbubbles size.

The decrease in bubble size by natural dissolution of the microbubble is accompanied with a decrease in the surface area of gas-water interface. And, the surface area of the gas-liquid interface decreases more rapidly as the bubble becomes smaller, as shown in FIG. 3. When the decreasing speed of the surface area is lower, the electric charge density at the gas-liquid interface does not change notably from the equilibrium condition. However, as shown in FIG. 4, when the bubble diameter has decreased to 10 μm or less, dissipation of electric charge cannot catch up to the speed of the size decrease, which is observed as an increase in zeta potential associated with deviation from equilibrium. However, the decrease in the surface area of the gas-liquid interface by natural dissolution is not so rapid, and the value of electric charge density remains up to several times larger than that in equilibrium, even at the point immediately before disappearance.

In contrast, during the collapsing of the microbubbles according to the present invention, the speed of the decrease of the surface area of the gas-liquid interface is very high, and the electric charge remains as it is without dissipation and deviates from equilibrium resulting in a generation of a region extremely higher in electrical charge density. When the microbubble having a diameter of 20 μm decreases to the size of 0.5 μm or less by collapsing, the electric charge density rises to a value as high as 1,000 times larger than that in equilibrium.

The extremely high-density electric charge formed by collapsing is in a non-equilibrium condition and extremely unstable, and the system returns to its stable state though a different method from a simple dissipation of a charge. Thus, an extremely large potential gradient is formed between the bubble interface and its surrounding area during the collapsing process, and the equilibrium of the electric charge condition is reestablished by electron transfer, for example, by discharge.

It means generation of an extremely high-density energy field, and when the collapsing is performed in water, it is accompanied with generation of free radical species as a result of the decomposition of ambient water molecules. In addition, because the electric charge carriers are OH⁻ and H⁺, the generated free radical species are •OH and •H through the neutralization of electric charge.

Since the free radical species are very highly reactive, they react with various compounds dissolved or suspended in solution, and it results in changing composition or decomposing the compounds in solution. Because an extreme reaction field of ultrahigh temperature and ultrahigh pressure is formed during collapsing, it becomes possible to sterilize microorganisms such as microbes and viruses and to decompose aromatic compounds such as phenol, although it was hitherto regarded as impossible. Examples of the substances decomposed by collapsing include almost all organic compounds, inorganic compounds such as $FeSO_4$, $CuNO_3$, $AgNO_3$, and $MnO_2$; dioxins PCBs, chlorofluorocarbons microbes, viruses, and the like.

Hereinafter, the method for collapsing the micro bubbles will be described.

Figure 5:
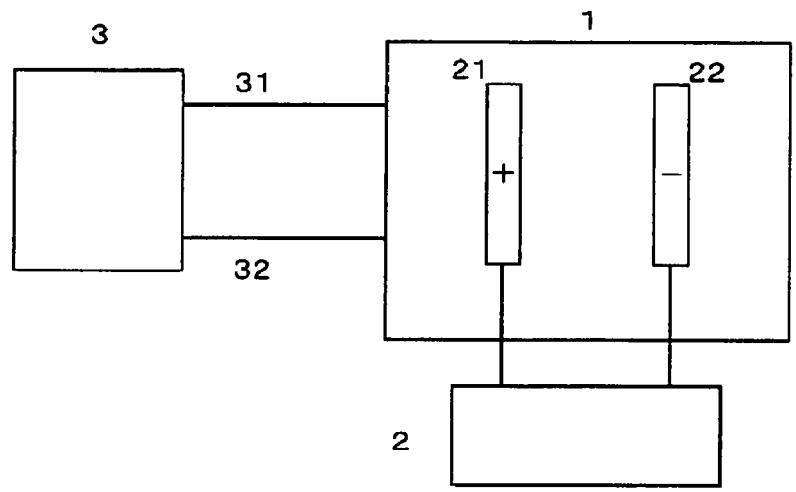
FIG. 5 is a side view of an apparatus for collapsing the microbubbles by using a discharger.

FIG. 5 is a side view illustrating an apparatus for collapsing the microbubbles by discharge. The microbubble generator 3 takes in the solution in a container 1 though an intake 31; a gas is injected into the microbubble generator 3 through an injection port (not shown in the Figure) for injecting a gas for generating microbubble and mixed with the solution taken in through the intake 31; and the microbubbles generated in the microbubble generator 3 are fed back into the container 1 through a microbubble-containing solution outlet 32. In this way, microbubbles are generated in the container 1. An anode 21 and a cathode 22 are placed in the container 1, and the anode 21 and the cathode 22 are connected to a discharger 2.

First, microbubbles are generated in the container 1 containing a solution by using the microbubble generator 3. The solution in the container 1 used for generation of microbubbles is preferably water (distilled water, tap water, or the like), seawater, or the like; and an organic solvent such as oil, alcohol, acetone, toluene, or petroleum oil may also be used. In the present specification, water is used as the solution for convenience in description, but the present invention is not limited thereto.

The electric discharge is generated in the solution of the container 1 by using the discharger 2. For more effective collapsing, the microbubble concentration in the container 1 is preferably 50% or more of the saturated concentration of microbubbles. In addition, the voltage of the underwater discharge is preferably 2,000 to 3,000 V. The stimulation caused by the underwater discharge accelerates the decreasing speed of the size of microbubbles and results in collapsing (disappearance) the bubbles. Extreme reaction fields are formed and free radicals such as •OH and •H are formed by decomposition of water, simultaneously with disappearance of microbubbles, and the substances and others present in water are decomposed.

The gas used for generation of micro bubbles in the microbubble generator 3 is not particularly limited, and the microbubbles may be generated with ozone or oxygen. Microbubbles generated with oxygen or ozone show higher in oxidative potential and result in generation of a greater number of free radical species during collapsing. These gases give a superior achievement in the decomposition of hazardous substances and others both in the quantitative and qualitative points as well as in sterilization. Alternatively, the microbubbles may be generated after oxygen or ozone is previously contained in the solution in the container.

Hereinafter, a method for collapsing the microbubbles by ultrasonication will be described. Description on the devices the same as those described in the method for collapsing the microbubbles by discharge will be omitted.

Figure 6:
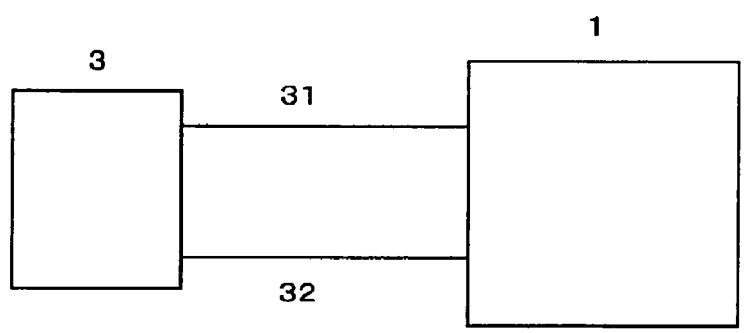
FIG. 6 is a side view of an apparatus for collapsing the microbubbles by using an ultrasonicator.

FIG. 6 is a side view illustrating an apparatus for collapsing the microbubbles by ultrasonic wave. A microbubble generator 3 takes in the solution in a container 1 though an intake 31; a gas injected into the microbubble generator 3 through an injection port (not shown in the Figure) for injecting a gas for generating microbubble and mixed with the solution taken in through the intake 31; and the microbubbles generated in the microbubble generator 3 are fed back into the container 1 through a microbubble-containing solution outlet 32. In this way, microbubbles are generated in the container 1. An ultrasonicator 4 is installed on the container 1. The installation site of the ultrasonicator 4 is not particularly limited, but preferably between the intake 31 and the microbubble-containing solution outlet 32, for more efficient collapsing the microbubbles.

Microbubbles are generated in the container 1 containing water by using the microbubble generator 3.

Then, an ultrasonic wave is irradiated on the microbubble-containing water in the container 1 by using the ultrasonicator 4. For more effective collapsing by the ultrasonic wave irradiation, the microbubble concentration in the container 1 is preferably 50% or more of the saturated condition of microbubbles. Ultrasonic wave irradiation at a saturation bubble concentration of 50% or more leads to more efficient collapsing. The irradiation frequency of the ultrasonic wave is preferably 20 kHz to 1 MHz; and the exposure time of ultrasonic wave is preferably 30 seconds or less, but the irradiation may be continued for an extended period of time.

As a conventional method, an ultrasonic wave has been used to decompose toxic substances. In this case, the ultrasonic wave is simply irradiated into normal water and the amount of generating free radicals is not enough to decompose aromatic compounds such as phenol. But, it became possible to disinfect microbes, viruses, and to decompose aromatic compounds such as phenol, which were not possible hitherto, by collapsing the microbubbles by irradiating ultrasonic wave on the microbubbles as in the present invention.

Hereinafter, a method for collapsing the micro bubbles by swirling current will be described. Description on the devices the same as those in the method for collapsing the microbubbles by electrical discharge and the method for collapsing the microbubbles by ultrasonication will be omitted.

Figure 7:
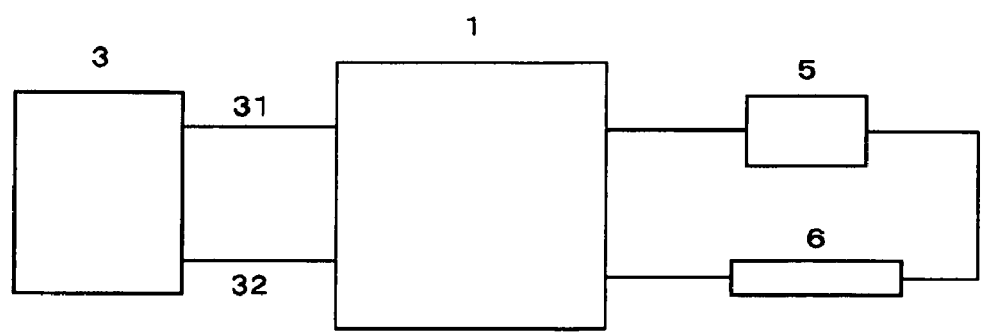
FIG. 7 is a side view of an apparatus for collapsing the microbubbles by using swirling current.

FIG. 7 is a side view illustrating an apparatus for collapsing the microbubbles by swirling current. A microbubble generator 3 takes in the solution in a container 1 though an intake 31; a gas injected into the microbubble generator 3 through an injection port (not shown in the Figure) for injecting a gas for generating microbubble and mixed with the solution taken in through the intake 31; and the microbubbles generated in the microbubble generator 3 are fed back into the container 1 through a microbubble-containing solution outlet 32. In this way, microbubbles are generated in the container 1. A circulation pump 5 is connected to the container 1 for partial circulation of the microbubble-containing solution in the container 1, and an orifice having multiple holes (porous plate) 6 is placed in the pipe (circulation pipe) which is connected to the circulation pump 5 at one end and to the container 1 at the other end. Part of the microbubble-containing solution poured out of the circulation pipe is re-circulated by the circulation pump and an swirling current is formed during passage through the orifice (porous plate) 6.

First, microbubbles are generated in the container 1 containing water by using the microbubble generator 3.

A part of the microbubble-containing water is then fed into the circulation pump 5 for partial circulation. The microbubble-containing water is further fed by the circulation pump 5 to the orifice (porous plate) 6, and an swirling current is formed in the pipe downstream thereof. The microbubbles are crushed by expansion or compression of the microbubbles during passage and by the electric swirling current generated by the swirl of electrically charged microbubbles due to the swirling current generated in the pipe. The positions of the circulation pump 5 and the orifice (porous plate) 6 on the channel may be altered.

Although only one orifice (porous plate) 6 is shown in FIG. 7, multiple orifices may be installed, and the circulation pump 5 may be eliminated as needed. Alternatively, the orifice 6 may be replaced with a punching plate. When a circulation pump 5 is installed, the pressure (positive pressure) of compressing the solution toward the orifice (porous plate) 6 is preferably 0.1 MPa or more. A positive pressure of less than 0.1 MPa may lead to insufficient eddy current generation. In addition, the pump 5 gives a negative pressure lower than the environmental pressure in the upstream pipe.

Figure 8:
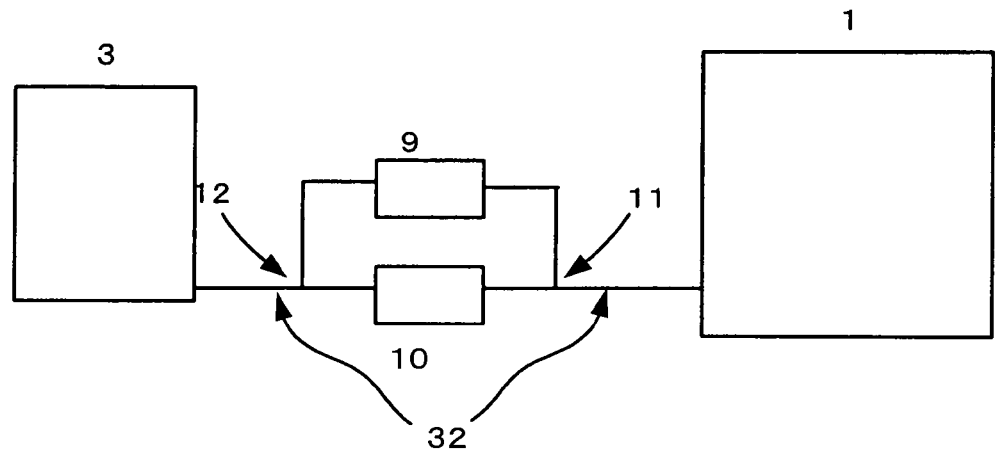
FIG. 8 is a side view of an apparatus for collapsing the microbubbles by using positive or negative pressure.
Figure 9:
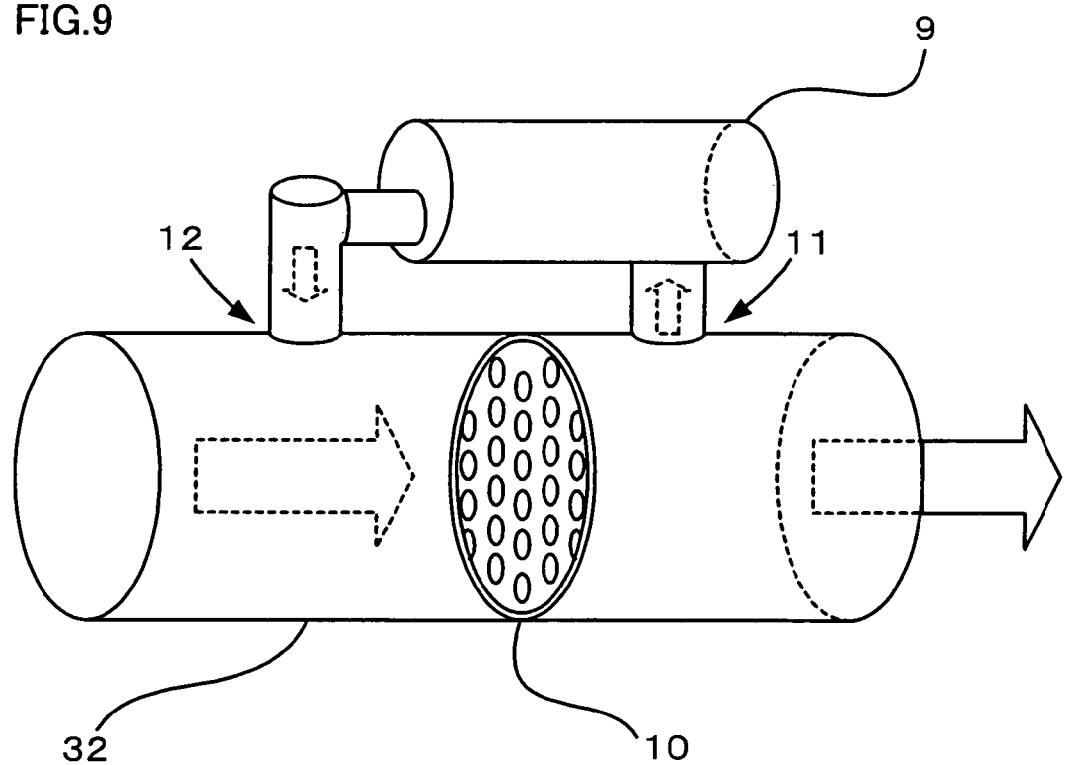
FIG. 9 is a partial side view of the apparatus for collapsing the microbubbles by using positive or negative pressure.

FIG. 8 is a side view illustrating a method for collapsing by using positive or negative pressure; and FIG. 9 is a partially magnified drawing of the area of a punching plate 10 and a pump 9 (the arrow in FIG. 9 indicates the direction of the flow of microbubble-containing solution). Description on the devices the same as those described above will be omitted.

As shown in FIG. 8, it is an apparatus for collapsing of microbubbles by draining the microbubble-containing water discharged from a microbubble generator 3 through a punching plate 10. The punching plate 10 is placed between two microbubble-containing solution outlets 32 (between the container 1 and the microbubble generator 3). An intake 11 for compressing the microbubble-containing solution to a pump 9 is formed between the punching plate 10 and the container 1 in the microbubble-containing solution outlet 32. Part of the microbubble-containing solution taken in into the intake 11 is fed to the pump 9 and then further forward by the pressure of the pump 9. The microbubble-containing solution is fed by the pump 9 via an outlet port 12 formed between the microbubble generator 3 and the punching plate 10 into the microbubble-containing solution outlet 32, and passes through the punching plate 10 once again. Thus, it is possible to crush the microbubbles by performing internal circulation forcibly by the pump 9 and increasing the swirling current drastically during passage through the punching plate 10. The positive pressure of the pump 9 is preferably adjusted to 0.1 MPa or more for the forcible internal circulation of the microbubble-containing solution in the microbubble-containing solution outlet 32. A positive pressure of pump 9 of less than 0.1 MPa may lead to the generation of insufficient internal circulation. The pump 9 also give a negative pressure lower than the environmental pressure in the intake side (intake 11). The positive pressure is a pressure higher than the environmental pressure, i.e., a pressure of the pump 9 feeding the solution, while the negative pressure is a pressure lower than the environmental pressure, i.e., a pressure generated when the pump 9 takes in the solution.

Multiple punching plates 10 may be installed according to application, and multiple pumps 9 may be installed as needed in the method for collapsing the microbubbles shown in FIGS. 8 and 9. In addition, for example, a check valve may be installed in the microbubble-containing solution outlet 32 as needed.

Hereinafter, a method for collapsing the microbubbles by using the catalytic action of an oxidizer during its reaction. Description on the devices the same as those described above will be omitted.

Figure 10:
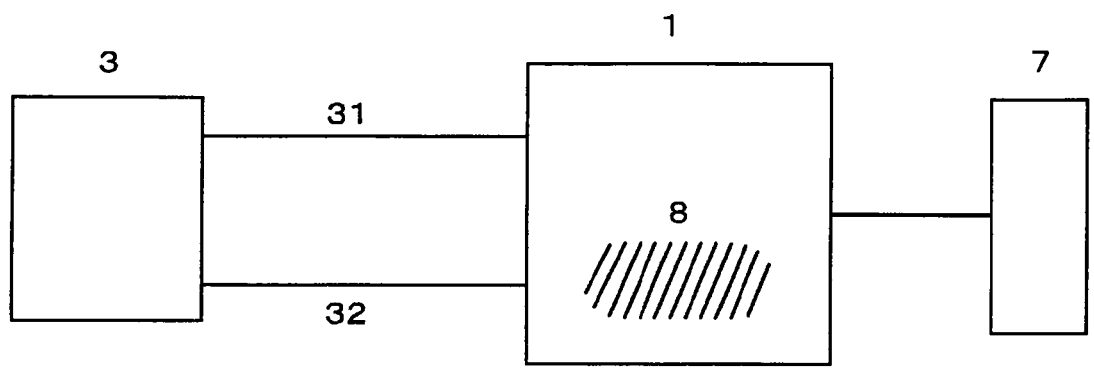
FIG. 10 is a side view of an apparatus for collapsing the microbubbles in the reaction of an oxidizer in the presence of a catalyst.

FIG. 10 is a side view illustrating an apparatus for collapsing the microbubbles by using the catalytic action of an oxidizer during its reaction. A microbubble generator 3 takes in the solution in a container 1 though an intake 31; a gas injected into the microbubble generator 3 through an injection port (not shown in the Figure) for injecting a gas for generating microbubble and mixed with the solution taken in through the intake 31; and the microbubbles generated in the microbubble generator 3 are fed back into the container 1 through a microbubble-containing solution outlet 32. In this way, microbubbles are generated in the container 1. An oxidizer-supplying unit 7 is connected to the container 1, and an oxidizer is supplied therefrom into the container 1.

Microbubbles are generated in the container 1 containing water by using the microbubble generator 3.

Then, a catalyst is added to the container 1. Favorable examples of the catalysts include various catalysts known in the art, including metal catalysts such as copper, palladium, iron, vanadium, tin, titanium, zirconium, platinum, manganese, cobalt, nickel, rubidium, rhodium, and zinc; these catalysts may be used alone or in combination of two or more; and copper is more preferable. The microbubbles may be generated after addition of the catalyst into the container 1.

An oxidizer is supplied from the oxidizer-supplying unit 7. The oxidizer is not particularly limited, and anyone of various known oxidizers such as ozone, hydrogen peroxide, sodium hypochlorite, manganese dioxide, sulfuric acid, nitric acid, potassium permanganate, copper chloride, and silver oxide may be used favorably; these oxidizers may be used alone or in combination of two or more; and in particular, ozone and hydrogen peroxide are more preferable.

Supply of an oxidizer into the container 1 results in generation of very high oxidative radicals in the reaction between the oxidizer and the catalyst. The radicals accelerate collapsing the microbubbles by their collision to the microbubbles. Although it is possible to decompose hazardous substances contained in water in the reaction between the oxidizer and the catalyst, it became possible to decompose hazardous substances more efficiently and also to decompose and sterilize microorganisms such as microbes and viruses, by the collapsing the microbubbles by using the catalytic action associated with the reaction between the oxidizer and the catalyst.

Hereinafter, the methods for collapsing the microbubbles will be described with reference to Examples, but it should be understood that the present invention is not restricted thereby.

EXAMPLES

Example 1

10 L of phenol-containing water was placed in the container 1 shown in FIG. 5. Microbubbles were generated in the microbubble generator 3 by using ozone as the gas for preparation of microbubbles and supplied into the water in the container 1, to give microbubble-containing water. The microbubbles were formed continuously, while the concentration of microbubbles in the container 1 was controlled to 50% or more of the saturated concentration of microbubbles.

Then, the water was electrically discharged at a voltage of 2,400 V ten times per 10 minutes by the discharger 2, for collapsing the microbubbles.

Figure 11:
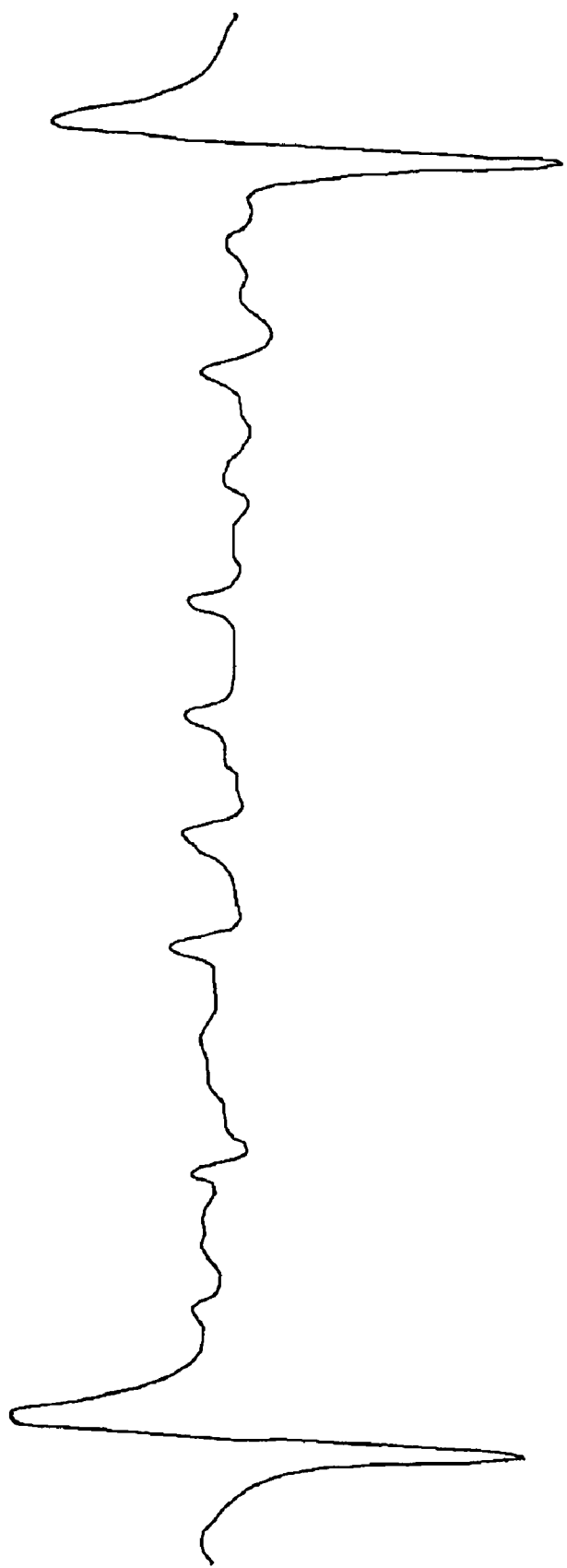
FIG. 11 is an ESR spectrum of the free radicals generated during collapsing the microbubbles.

FIG. 11 shows the ESR spectrum of the water during collapsing and conforms the presence of free radical species therein. The ESR spectrum shown in FIG. 11 is determined, as a spin-trapping agent 5,5-dimethyl-l-pyrroline-N-oxide (DMPO) is added to the sample. The results demonstrated generation of free radicals.

After the collapsing the microbubbles, phenol was decomposed completely.

Example 2

10 L of phenol-containing water was placed in the container shown in FIG. 6. Microbubbles were generated in the microbubble generator 3 by using ozone as the gas for preparation of micro bubbles and supplied into the water in the container 1, to give microbubble-containing water. Microbubbles were formed continuously, while the concentration of microbubbles in the container 1 was controlled to 50% or more of the saturated concentration of microbubbles.

Then, the microbubbles are crushed by irradiation of an ultrasonic wave at an irradiation frequency of 200 kHz by the ultrasonicator 4 for 10 minutes. ESR spectral analysis of the water during collapsing indicates that the result is similar to that shown in FIG. 11.

Phenol was decomposed completely after the collapsing the microbubbles.

Example 3

10 L of phenol-containing water was placed in the container 1 shown in FIG. 7. Microbubbles were generated in the microbubble generator 3 by using ozone as the gas for preparation of microbubbles and supplied into the water in the container 1, to give microbubble-containing water. Microbubbles were formed continuously, while the concentration of microbubbles in the container 1 was controlled to 50% or more of the saturated concentration of microbubbles.

Then, the microbubble-containing water in the container 1 was circulated partially, and part of the microbubble-containing water was introduced into the circulation pipe connected to the circulation pump 5. The microbubble-containing water introduced into the circulation pump 5 was fed to the orifice (porous plate) 6 at a positive pressure of 0.3 MPa, allowing the microbubbles crushed by the swirling current generated there.

ESR spectral analysis of the water during collapsing similar to that ii Example 1 gave an ESR spectrum similar to that shown in FIG. 11.

Phenol was decomposed completely after the collapsing the microbubbles.

Example 4

10 L of phenol-containing water was placed in the container shown in FIG. 8. Microbubbles were generated in the microbubble generator 3 by using ozone as the gas for preparation of microbubbles and supplied into the water in the container 1, to give microbubble-containing water. Microbubbles were formed continuously, while the concentration of microbubbles in the container 1 was controlled to 50% or more of the saturated concentration of microbubbles.

Then, part of the microbubble-containing water discharged from the microbubble generator 3 and passing out of the punching plate 10 was taken in through the intake 11 and fed to the discharge side by operation of the pump 9, for forcibly internal circulation thereof in the microbubble-containing solution outlet 32. The positive pressure of the pump 9 then was 0.5 MPa. The microbubble-containing water fed by the pump 9 was made to pass through the punching plate 10 once again via the outlet port 12. Such an internal circulation raised the swirling-current efficiency drastically and was effective in collapsing the microbubbles.

ESR spectrum analysis of the water during collapsing similar to that in Example 1 gave an ESR spectrum similar to that shown in FIG. 11.

Phenol was decomposed completely after the collapsing the microbubbles.

Example 5

10 L of phenol-containing water was placed in the container 1 shown in FIG. 10. Microbubbles were generated in the microbubble generator 3 by using ozone as the gas for preparation of microbubbles and supplied into the water in the container 1, to give microbubble-containing water. Microbubbles were formed continuously, while the concentration of microbubbles in the container 1 was controlled to 50% or more of the saturated concentration of microbubbles.

Then, 5 g of a powdery copper catalyst was placed in the container 1, and an ozone gas was supplied from the oxidizer-supplying unit 7 into the container 1. The amount of the ozone gas supplied was 1 g. The micro bubbles were crushed by the catalytic reaction associated with the reaction between the ozone gas and the copper catalyst when the ozone gas was supplied.

ESR spectrum analysis of the water during collapsing similar to that in Example 1 gave an ESR spectrum similar to that shown in FIG. 11.

Phenol was decomposed completely after the collapsing the microbubbles.

ADVANTAGEOUS EFFECTS OF THE INVENTION

Collapsing the micro bubbles by the method according to the present invention lead to increase in the speed of microbubbles size decrease due to utilization of a stimulation (discharge, ultrasonic wave, swirling current, positive and negative pressure, or the catalytic reaction associated with the reaction of oxidizer, or the like), disappearance of microbubbles and generation of active oxygen species and free radical species for decomposition of substances present inside the microbubbles or in the area surrounding the microbubbles, and compositional change thereby of the chemical substances dissolved or floated in water; and thus, it became possible to sterilize microorganisms such as microbes, viruses, and others present in solution and decompose aromatic compounds such as phenol, which was difficult in the past, and thus, to decompose almost all hazardous substances and others.

INDUSTRIAL APPLICABILITY

By the collapsing the microbubbles according to the present invention, it became possible to sterilize microorganisms such as microbes, viruses, and others present in solution and decompose aromatic compounds such as phenol, which were difficult to decompose in the past, and the method is applicable in the fields for processing hazardous substances and the like.

What is claimed is:

1. A method for collapsing microbubbles, the microbubbles having a diameter of 50 µm or less and floating in a solution and decreasing gradually in size by natural dissolution of a gas contained in the microbubbles, the method comprising:
   circulating the solution between a container and a microbubble generator along a first path;
   injecting the gas into the solution in the microbubble generator to form the microbubbles in the solution;
   circulating a portion of the solution containing the microbubbles between the container and one of an orifice plate and a porous plate along a second path; and
   accelerating a speed of microbubble size decrease and disappearance by passing the solution containing the microbubbles through the one of the orifice plate and the porous plate,
   wherein a great amount of free radical species are released from a gas-liquid interface by increasing a charge density at the gas-liquid interface of the microbubbles.

2. The method according to claim 1, wherein free radical species comprising active oxygen species for decomposition of substances present inside the microbubbles or in an area surrounding the microbubbles are generated by collapsing the microbubbles by the passing of the solution containing the microbubbles through the one of the orifice plate and the porous plate.

3. The method according to claim 1, wherein the method gives rise to a compositional change of chemical substances dissolved or floated in the solution.

4. The method according to claim 1, wherein the method sterilizes microbes, viruses, and other microorganisms present in the solution.

5. The method according to claim 1, wherein
   the circulating of the portion of the solution containing the microbubbles along the second path includes circulating the portion of the solution containing the microbubbles in a circulation pipe with a circulation pump connected to the circulation pipe, and
   the accelerating of the speed of microbubble size decrease and disappearance comprises generating compression, expansion and a swirling current in the solution containing the microbubbles by the passing of the solution containing the microbubbles through the one of the orifice plate and the porous plate, which has a single hole or multiple holes and is installed in the circulation pipe.

6. The method according to claim 5, wherein the circulation pump gives a positive pressure of 0.1 MPa or more to a discharge side.

7. The method according to claim 5, wherein the circulation pump give a negative pressure lower than an environmental pressure to an intake side.

8. The method according to claim 1, wherein the gas is ozone.

9. The method according to claim 1,
   wherein the circulating of the solution between the container and the microbubble generator comprises:
      supplying the solution from the container to the microbubble generator via a first circulation pipe; and
      supplying the solution containing the microbubbles from the microbubble generator back to the container via the first circulation pipe, and
   wherein the circulating of the portion of the solution containing the microbubbles between the container and the one of the orifice plate and the porous plate comprises:
      supplying the portion of the solution from the container to the one of the orifice plate and the porous plate via a second circulation pipe;
      passing the portion of the solution through the one of the orifice plate and the porous plate contained in the second circulation pipe; and
      returning the portion of the solution that has passed through the one of the orifice plate and the porous plate to the container via the second circulation pipe.

10. The method according to claim 1, wherein the circulating of the portion of the solution containing the microbubbles comprises circulating the portion of the solution containing the microbubbles between the container and the one of a plurality of orifice plates and a plurality of porous plates along the second path.

* * * * *